United States Patent
Le

(10) Patent No.: US 7,522,050 B2
(45) Date of Patent: Apr. 21, 2009

(54) SYSTEM AND METHOD OF RFID DEVICE MANAGEMENT

(75) Inventor: Trong Le, Mississauga (CA)

(73) Assignee: Psion Teklogix Inc., Mississauga, Ontario (CA)

( * ) Notice: Subject to any disclaimer, the term of this patent is extended or adjusted under 35 U.S.C. 154(b) by 59 days.

(21) Appl. No.: 11/394,384

(22) Filed: Mar. 30, 2006

(65) Prior Publication Data

US 2007/0250358 A1 Oct. 25, 2007

(51) Int. Cl.
*G08B 13/14* (2006.01)
(52) U.S. Cl. .................................... 340/572.1; 235/385
(58) Field of Classification Search ............. 340/572.1, 340/10.1, 551; 700/214, 215; 235/385
See application file for complete search history.

(56) References Cited

U.S. PATENT DOCUMENTS

| 7,152,011 | B2* | 12/2006 | Benjamin et al. | 702/117 |
| 7,165,722 | B2* | 1/2007 | Shafer et al. | 235/385 |
| 7,204,409 | B2* | 4/2007 | Kumar et al. | 235/375 |
| 7,258,266 | B1* | 8/2007 | Bowe et al. | 235/385 |
| 7,267,275 | B2* | 9/2007 | Cox et al. | 340/572.1 |
| 2005/0092825 | A1* | 5/2005 | Cox et al. | 340/572.1 |

* cited by examiner

*Primary Examiner*—John A Tweel, Jr.
(74) *Attorney, Agent, or Firm*—Perman & Green, LLP

(57) ABSTRACT

A radio frequency identification management system and method of managing one or more radio frequency identification devices is provided. The radio frequency identification (RFID) management system comprises a device manager for managing one or more RFID devices, and one or more RFID device drivers for communicating with and operating the one or more RFID devices. The method comprises the steps of managing one or more RFID devices through a device manager, and operating the one or more RFID devices through the device manager.

18 Claims, 5 Drawing Sheets

SYSTEM AND METHOD OF RFID DEVICE MANAGEMENT

FIELD OF INVENTION

Radio frequency identification (RFID) is a radio technology for identifying, tracking and locating assets. A basic system includes a reader, an antenna and multiple tags. An RFID tag can be electronically programmed with information. Hence a tag can be read from or written to by a reader.

BACKGROUND OF THE INVENTION

Radio frequency identification (RFID) is a radio technology for identifying, tracking and locating assets.

A basic system includes a reader, an antenna and multiple tags. An RFID tag can be electronically programmed with information. Hence a tag can be read from or written to by a reader.

RFID readers from different manufacturers behave in different ways and have different characteristics. A middleware level programmer must have knowledge of all RFID devices existing in a network system, and has to implement RFID management directly. Managing a plurality of RFID devices over a network can be cumbersome and costly. There is a need for means to efficiently manage a network of handhelds and fixed readers for various business applications.

SUMMARY OF THE INVENTION

The present invention relates to radio frequency identification (RFID) where the management of a plurality of RFID devices is performed centrally. It is an object of the invention to provide a system and method of RFID device management.

In accordance with an embodiment of the present invention, there is provided a radio frequency identification management system for managing one or more radio frequency identification devices. The radio frequency identification (RFID) management system comprises a device manager for managing one or more RFID devices, and one or more RFID device drivers for communicating with and operating the one or more RFID devices.

In accordance with another embodiment of the present invention, there is provided a method of managing one or more radio frequency identification devices. The method comprises the steps of managing one or more RFID devices through a device manager, and operating the one or more RFID devices through the device manager.

In accordance with another embodiment of the present invention, there is provided a computer data signal embodied in a carrier wave and representing sequences of instructions which, when executed by a processor, cause the processor to perform a method of managing one or more radio frequency identification devices. The method comprises the steps of managing one or more RFID devices through a device manager, and operating the one or more RFID devices through the device manager.

A computer-readable media for storing instructions or statements for use in the execution in a computer of a method of managing one or more radio frequency identification devices. The method comprises the steps of managing one or more RFID devices through a device manager, and operating the one or more RFID devices through the device manager.

A computer program product for use in the execution in a computer of a radio frequency identification management system for managing one or more radio frequency identification devices. The radio frequency identification management system comprises a device manager for managing one or more RFID devices, and one or more RFID device drivers for communicating with and operating the one or more RFID devices.

This summary of the invention does not necessarily describe all features of the invention.

BRIEF DESCRIPTION OF THE DRAWINGS

These and other features of the invention will become more apparent from the following description in which reference is made to the appended drawings wherein.

DETAILED DESCRIPTION

The following description is of a preferred embodiment.

The present invention will be further illustrated in the following examples.

Figure 1:
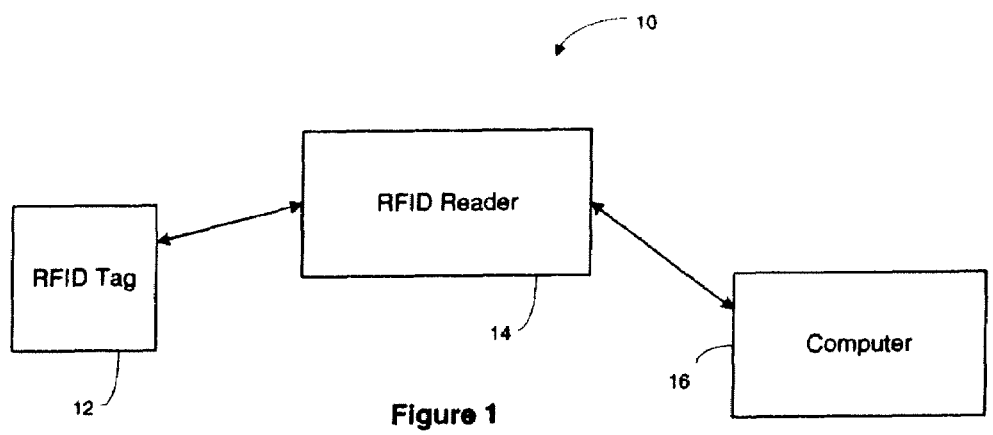
FIG. 1 shows in a network connectivity diagram an example of a system overview of a radio frequency identification environment.

FIG. 1 shows in a network connectivity diagram an example of a system overview of a radio frequency identification (RFID) environment 10. The RFID environment comprises an RFID tag 12 which is associated with (i.e., located near or affixed to) an asset, an RFID reader 14 for reading from or writing to the RFID tag 10, and a computer 16 for operating the RFID reader 14 to obtain information regarding the asset associated with the RFID tag 10. RFID readers can be fixed or embedded. Fixed readers are typically encased and attached to a fixture. Embedded readers are typically found in handheld or mobile devices.

RFID readers in the industry operate in ultra high frequency (UHF), high frequency (HF) or low frequency (LF) ranges.

RFID readers can be categorized into types such as handheld, portal, conveyor belt, fork truck, etc. Each type represents a certain set of behaviors for certain applications. For example, handheld RFID readers are typically those that are connected to a handheld device.

They share the same characteristics such as no autonomous mode, data acquisition is mostly synchronous, or of request/response type, can sometimes do writes or updates. Portal readers are those that normally operate in autonomous mode.

The amount of tags read can be substantially more than that of handheld and the read rate is typically slower than conveyor belt type.

Figure 2:
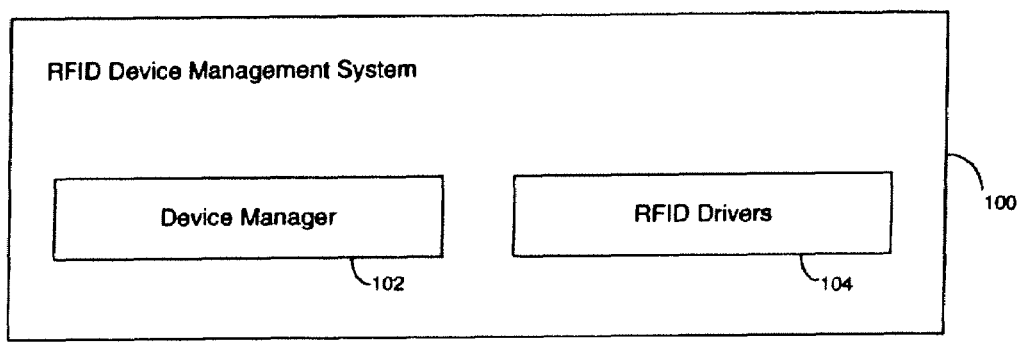
FIG. 2 shows in a software module diagram an example of a system overview of a radio frequency identification device management system, in accordance with an embodiment of the invention.

FIG. 2 shows in a software module diagram an example of a system overview of a radio frequency identification (RFID) device management system 100, in accordance with an embodiment of the present invention. The RFID device management system 100 comprises a device manager 102 for managing one or more RFID device (i.e., RFID reader 14), and one or more RFID devices. The device manager may further manage auxiliary hardware and the RFID system 100 may further comprise one or more device drivers for operating the auxiliary hardware, such as motion sensors, temperature sensors, light stack and other known auxiliary hardware.

Preferably, device manager 102 performs device management operations including: setting of the power level of RFID readers 14; the setting of tag types (for example, ISO 18006, EPC class 0, EPC class 0+, EPC class 1, EPC class 1 generation 2, and other tag types known in the industry); sending function commands to the RFID reader (such as inventory, read user data, write ID, write user data, kill tag, and other commands known in the industry); statistic and diagnostic information collection (such as the number of tags scanned over a time period, if a reader is down (fixed reader), if a reader connection is lost (fixed or embedded readers), and other statistic and diagnostic information collection operations known in the industry); filtering (such as reading only tags that fit certain patterns); smoothing (such as only returning the unique tag, i.e., only returning one instance of a tag when the same tag read more than once); and other device management functions known in the industry. Preferably, communication between a device manager 102 and RFID reader drivers 104 is performed using a command-response scheme rather than subscriber-publisher or event driven. Advantageously, command-response is simpler, easier to implement, a better fit for backward compatibility support, and there is no need for elaborate scheme of sharing data at this level. The RFID device management system 100 can be implemented as a sequence of instructions embedded in a computer readable medium.

There can be multiple device managers 102 in the system 100. A device manager manages readers of the same type. Therefore, there is at least one device manager 102 for each type of reader in the system 100. However, the total number of device managers 102 typically depends on how the system 100 as a whole is configured. Typically, there is one device manager 102 for every handheld, one 102 for every portal, one 102 for every checkpoint on a conveyor belt, etc.

Figure 3:
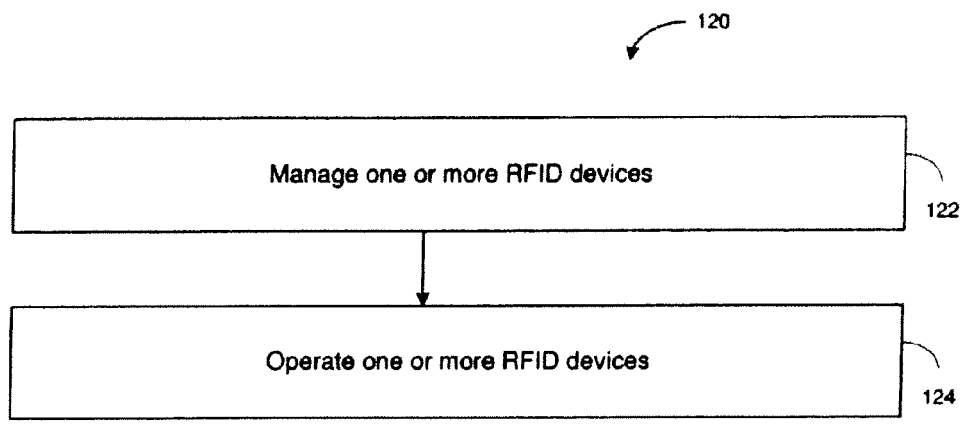
FIG. 3 shows in a flowchart an example of a method of radio frequency identification device management, in accordance with an embodiment of the radio frequency identification device management system.

FIG. 3 shows in a flowchart an example of a method of radio frequency identification device management (120), in accordance with an embodiment of the radio frequency identification management system 100. The method (120) begins with managing one or more RFID devices (122).

Next, one or more RFID devices are operated (124) by the one or more RFID device drivers. Other steps may be added to this method (120).

Figure 4:
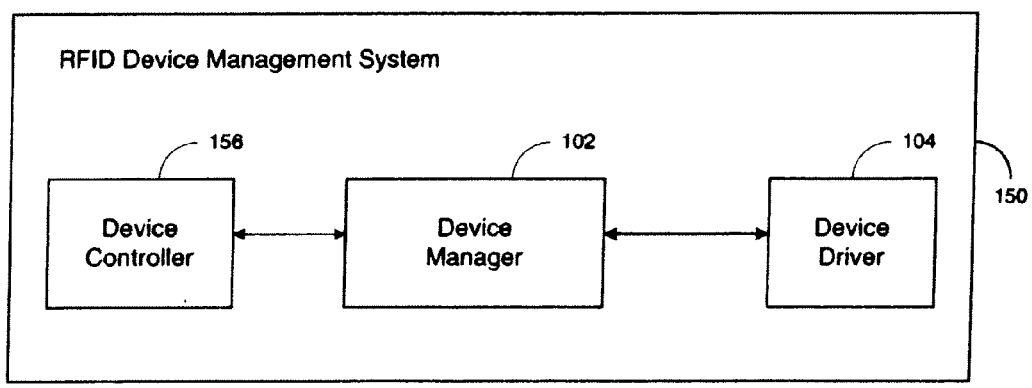
FIG. 4 shows in a software module diagram another example of a system overview of a radio frequency identification (RFID) management system.

FIG. 4 shows in a software module diagram another example of a system overview of a radio frequency identification (RFID) management system 150. The RFID management system 150 comprises a device controller 156, one or more device managers 102, and one or more device drivers 104. The device manager may further manage auxiliary hardware and the RFID system 150 may further comprise one or more device drivers for operating the auxiliary hardware, such as motion sensors, temperature sensors, light stack and other known auxiliary hardware. The device controller 156 interfaces the RFID devices to the upper layer software applications through the device manager 102. The device controller 156 provides a single point of contact for middleware applications to configure and control RFID devices in the system 150. Device managers 102 communicate to the device controller 156. A main objective of a device manager 102 is to shield the device controller 156 from the tedious task of managing the RFID devices 104 individually. Preferably, communication between a device manager 102 and upper level applications, device manager 102 and the device controller 156, and device controller 156 and upper level applications are performed using a command-response scheme rather than subscriber-publisher or event driven.

The device controller 156 is a central point for the configuration and monitoring of RFID devices 104 through the device manager 102. Preferably, there is only one such module in the system 150. The device controller 156 communicates to all readers 104 through device managers 102. The device controller 156 provides a means for users to configure all readers 104, and gathers statistics and errors to provide real-time administration of the system 150. The statistics and errors gathered are those typically gathered at the device level. Advantageously, such statistics and errors can now be analyzed at the device controller level for more effective global management of the devices.

Preferably, the software interface for host-to-device controller 156 is the same as that for host-to-device device manager 102. This mechanism enables multiple possible command and data paths between the host and the readers.

In host-to-device controller-to-device manager paths, this is the longest path for the reader 104. The command/data from the host can be passed on to the reader 104 via the device controller 156 through a device manager 102 and to the reader 104, and vice versa. One advantage of this method is its simplicity: The host application needs to make only one communication link to the device controller 156 to gain control of all individual readers 104 in the system 150.

In host-to-device manager-to-reader paths, there are one or more host applications accessing the readers 104 through their device managers 102. An advantage of this method is that data does not go through a device controller 156, and thus eliminates one layer of software/communication. However there is additional application and data management, especially for handheld devices, such as ensuring application software version, data synchronization, communication link status, and so forth.

The RFID system 150 may also include a plurality of device controllers 156 where each controller may communicate with one another. Such a plurality of device controllers 156 can be used to control multiple independent RFID schemes or configurations. Advantageously, in such scenarios, the plurality of device controllers 156 can be centrally administered by one console.

Figure 5:
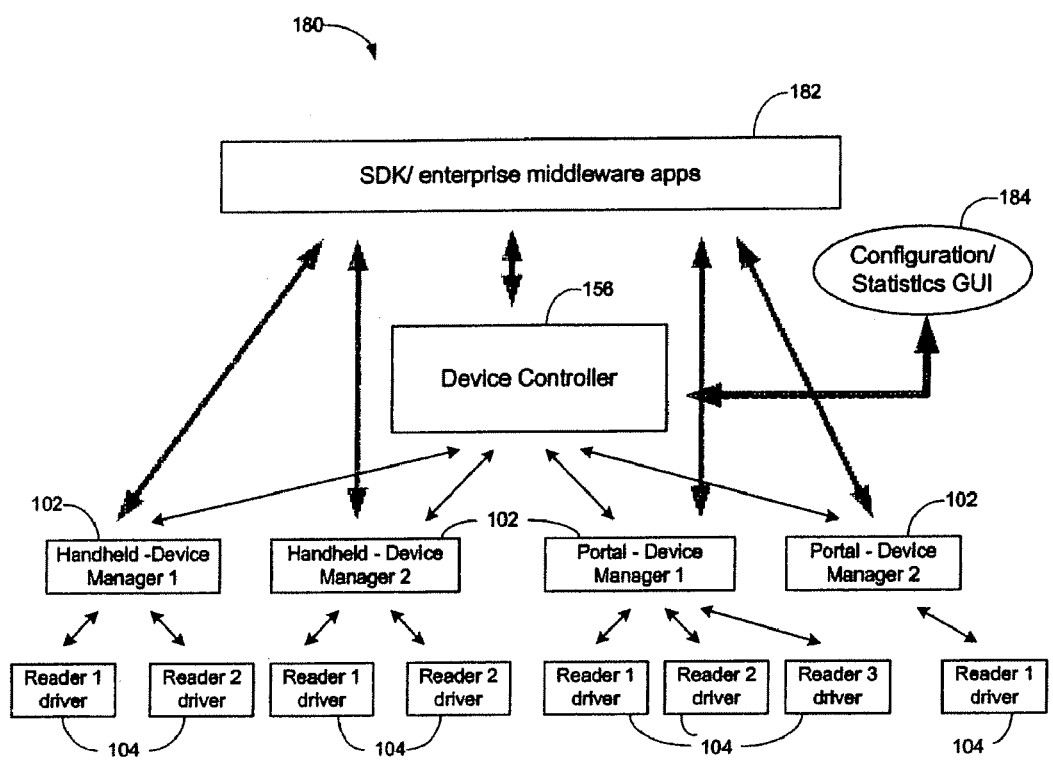
FIG. 5 shows in a software module diagram an example of an RFID device management environment, in accordance with an embodiment of the RFID device management system.

FIG. 5 shows in a software module diagram an example of an RFID device management environment 180, in accordance with an embodiment of the RFID device management system 150. The RFID device management environment comprises software development kit/ enterprise middleware applications 182 that use information from the RFID devices, a configuration/ statistics graphical user interface (GUI) 184 for obtaining statistics and errors for real-time administration of the RFID device management system 100, 150, the device controller 156, a plurality of device managers 102 for managing different types of devices, and a plurality of reader drivers (or device drivers 104) for communicating with the RFID devices. Each device driver 104 communicates with an RFID device. A plurality of device drivers communicate with a device manager 102 of a type. The device managers 102 can either communicate with the middleware applications 182 directly or through the device controller 156. The device controller 156 communicates with the configuration/statistics GUI 184.

There are different levels of device abstraction in the RFID device management system 100, 150. At the device driver 104 level, device drivers 104 preferably implement a set of common functions and parameters so that they appear to behave in the same way to the device manager 102. Examples of common parameters include tag types and power level. Examples of common functions or commands include inventory and read user data.

At the device manager 102 level, there is preferably a common device driver 104 interface to the device drivers 104. This device interface provides device driver 104 level abstraction as explained above. A device manager 102 may also include an application interface and a device controller 156 interface. These two interfaces share the same set of functions and parameters that are common for that particular device manager 102, such as portal, conveyor belt, handhelds, and so on. The application interface and device controller 156 interfaces are preferably designed to facilitate business logic, whereas the device manager 104 interface is preferably designed to allow ease of control of hardware devices.

A device manager 102 can be considered as a group of device readers 104. However, to facilitate design of business logic, device managers 102 are preferably categorized into conveyor belt, portal, handheld, forklift, and other types of device readers 104. Each category/type is a group of device readers and/or accessories present a set of characteristics particular to that category/type.

A portal device manager generally includes functions such as asynchronous read to invoke a read operation automatically and tag data returned to upper level application periodically, trigger definition to attach a trigger to a read operation, antenna selection to associate a read with particular one or more antennas. A conveyor belt device manager generally includes functions similar to those of a portal device manager, but data is returned more frequently and tends to be in less amounts. A device manager for handhelds tends to include a display, one or more physical triggers such as keystrokes or pistol trigger, and one or two antennas. A forklift device manager may include one reader, multiple antennas and possible with no external physical triggers.

Figure 6:
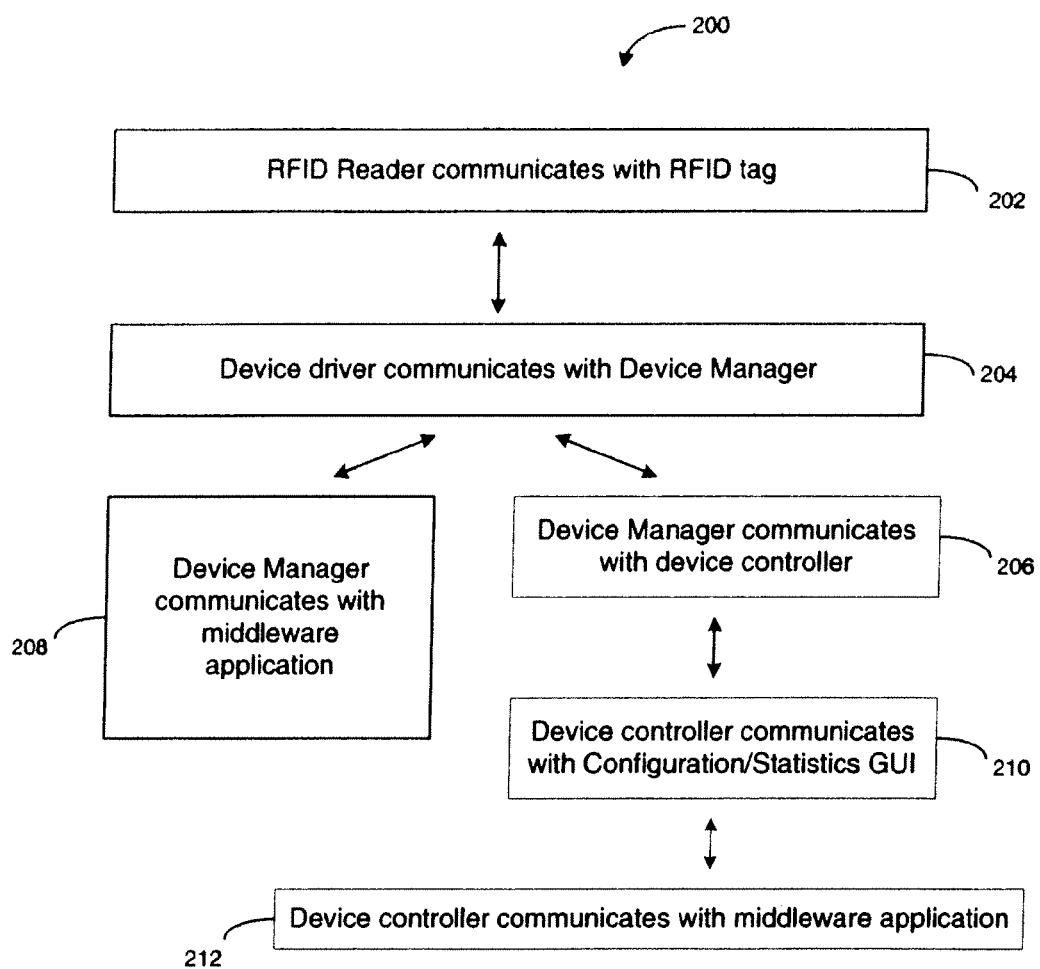
FIG. 6 shows in a flowchart another example of a method of radio frequency identification device management, in accordance with an embodiment of the radio frequency identification management system.

FIG. 6 shows in a flowchart another example of a method of radio frequency identification device management (200), in accordance with an embodiment of the radio frequency identification management system 100, 150.

The method (200) begins with an RFID device communicating with an RFID tag (202). The information received by the RFID device is obtained by the device driver 104 and sent to the device manager 102 (204). The device manager 102 can communicate the information to the device controller 156 (206) or directly to the middleware application 182 (208). If the device controller 156 received the information (204), then the information is communicated with the configuration/statistics GUI 184 (210) and the information is passed to the middleware application 182 (212). Other steps may be added to the method (200), including the device controller 156 receiving information from a plurality of device managers and communicating the information to the middleware application.

FIG. 6 also shows the reverse information flow. A middleware application 182 requests information from either a device controller 156 (210) or directly from a device manager 102 (208). If the request was made to the device controller 156 (212), then the request is passed to the device manager 102 (206). The device manager 102 passes the request to the appropriate device driver 104 (204). The device driver 104 will then operate the RFID device to communicate with an RFID tag (202).

Figure 7:
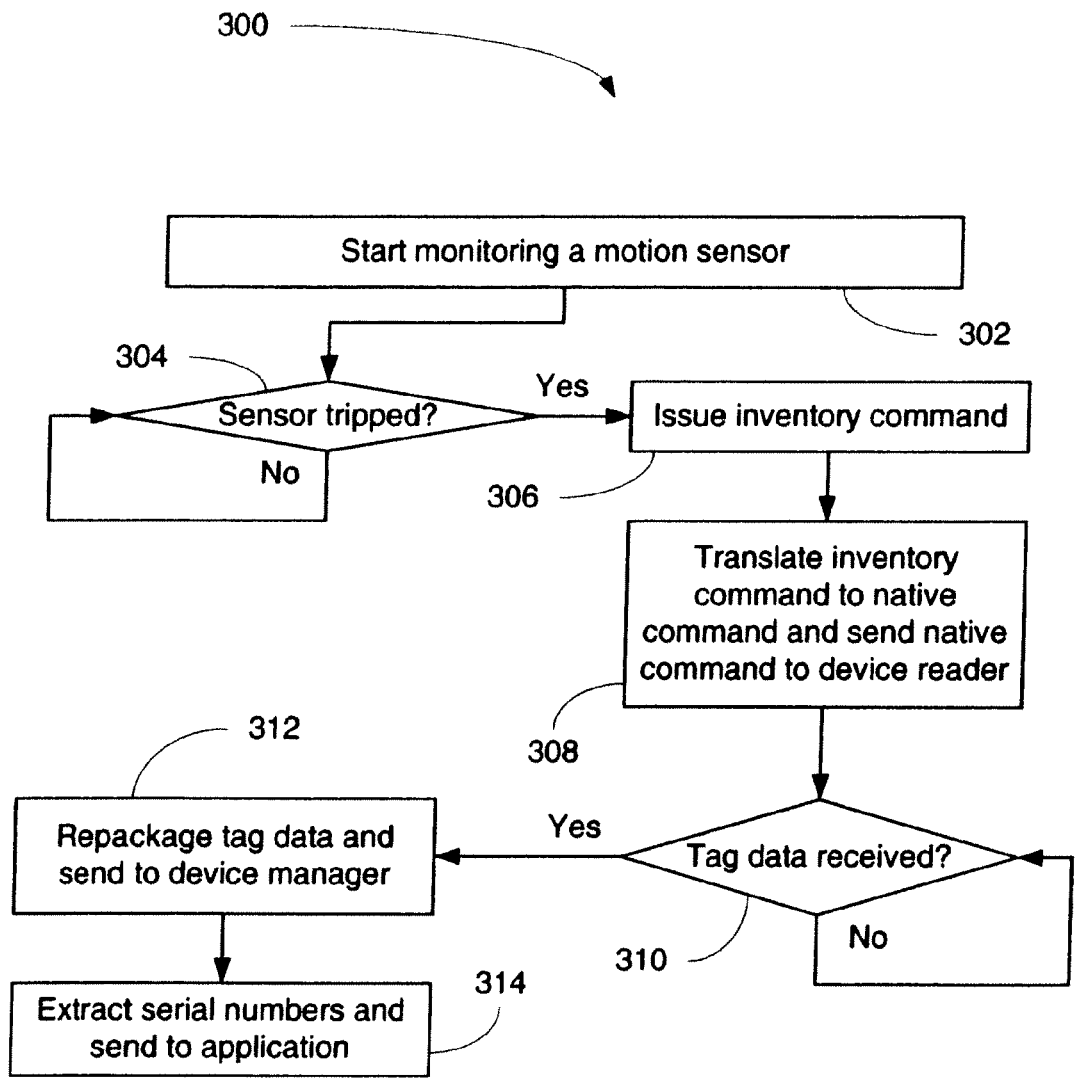
FIG. 7 shows in a flowchart an example of a method of obtaining serial number information, in accordance with an embodiment of the RFID management system.

FIG. 7 shows in a flowchart an example of a method of obtaining serial number information (300), in accordance with an embodiment of the RFID management system 100, 150. In this example, a business logic application needs to know serial numbers of all tags passing by a particular portal (one or more device readers). The portal device manager 102 is set up to trigger a read when the motion sensor is tripped. In this step, the device manager 102 starts monitoring a motion sensor (302) in the device reader. Next, the device manager waits for data, i.e., the device manager 102 waits for the sensor to be tripped (304). Once this occurs (304), the device manager 102 issues an inventory command to the device reader driver 104 (306). The device reader driver 104 translates the command to an inventory command that is native to the reader, and then sends the native inventory comment to the reader (308). The reader driver 104 then monitors for input data from the reader hardware (310). Once the reader driver obtains tag data (312), the data is repackaged and sent to the device manager 102 (314). The device manager 102 then extracts serial numbers from the data and sends the serial numbers to the application (316).

The RFID device management system 100, 150 includes the benefits of providing one common software interface to upper level applications, facilitating configuration and management of all RFID devices in the system, supporting most if not all known readers, supporting most if not all known tag types, providing support for enterprise applications, providing capability to control multiple readers remotely, and providing reasonable scalability and flexibility for future system enhancements.

Advantageously, the RFID management system 100, 150, provides ease of programming since there is no need for middleware programmers to know RFID hardware/firmware details. Also, RFID 104 devices of the same characteristics can be grouped together to provide better device management. Such a grouping concept bridges business logic with device management. For example, conveyor belt characteristics are different from portal characteristics or handheld characteristics. Hence, a conveyor belt device manager, a portal device manager and a handheld device manager are designed for their respective grouping. A business application that communicates to a portal device manager can expect support of features that are typically inherent to a portal such as autonomous mode, multiple antennas, continuous power supply, and other known features of portals. Similarly, a handheld device manager is expected to handle one antenna, limited power supply, therefore read/write normally done in bursts, triggers internally to handheld only, and other handheld features.

The device controller 156 can control each of the different device categories.

The present invention has been described with regard to one or more embodiments. However, it will be apparent to persons skilled in the art that a number of variations and modifications can be made without departing from the scope of the invention as defined in the claims.

The invention claimed is:

1. A radio frequency identification management system for managing a plurality of radio frequency identification devices, the radio frequency identification (RFID) management system comprising:
    a plurality of RFID device drivers for communicating with and operating the plurality of RFID devices;

a plurality of device managers, each device manager for managing and communicating with one or more RFID devices through a RFID device driver of the plurality of RFID device drivers; and a device controller for interfacing the plurality of device managers with upper layer software applications.

2. The radio frequency identification management system as claimed in claim 1, wherein a device manager of the plurality of device manager further manages auxiliary hardware and the system further comprises one or more device drivers for communicating with and operating the auxiliary hardware.

3. The radio frequency identification management system as claimed in claim 1, wherein the plurality of device managers can further interface directly with the upper layer software applications.

4. The radio frequency identification management system as claimed in claim 3, wherein at least one RFID device driver of the plurality of RFID device drivers communicates with a RFID device of the plurality of RFID devices using a command-response scheme.

5. The radio frequency identification management system as claimed in claim 1, wherein the plurality of device managers comprise a plurality of different types of device managers, each different device manager type for managing and communicating with a plurality of devices of the type.

6. The radio frequency identification management system as claimed in claim 5, each different device manager type is one of:
    a portal type device manager for managing and communicating with a plurality of portal type devices;
    a conveyor belt type device manager for managing and communicating with a plurality of conveyor belt type devices;
    a forklift type device manager for managing and communicating with a plurality of forklift type devices; and
    a handheld type device manager for managing and communicating with a plurality of handheld type devices.

7. The radio frequency identification management system as claimed in claim 1, wherein the device controller communicates with at least one device manager of the plurality of device managers using a command-response scheme.

8. The radio frequency identification management system as claimed in claim 1, wherein the device controller gathers statistics and errors of the plurality of RFID devices through the plurality of device managers for real-time administration of the system.

9. A method of managing a plurality of radio frequency identification (RFID) devices, the method comprising:
    interfacing upper layer software applications with a plurality of device managers, the interfacing achieved through a device controller;
    managing and communicating with a plurality of RFID device drivers, the managing and communicating with achieved using individual device managers; and
    communicating with and operating one or more RFID devices of the plurality of RFID devices, the communicating with and operating achieved through a RFID device driver of the plurality of RFID device drivers.

10. The method claimed in claim 9, wherein managing the plurality of RFID device drivers using individual device managers includes:
    communicating device management commands to one or more RFID device drivers of the RFID device drivers.

11. The method claimed in claim 9, wherein communicating with one or more RFID device drivers of the plurality of RFID device drivers comprises:
    communicating operation commands to an RFID device from a device manager using a RFID device driver; and
    receiving operation command responses from the RFID device at the RFID device driver and communicating the operating command response to the device manager using the RFID device driver.

12. The method claimed in claim 9, further comprising the step of:
    managing auxiliary hardware.

13. The method as claimed in claim 9, further comprising the step of:
    gathering statistics and errors for real-time administration of the system.

14. A computer-readable storage medium having computer readable code embodied therein for execution in a computer of a method of managing a plurality of radio frequency identification (RFID) devices, the method comprising:
    interfacing upper layer software applications with a plurality of device managers, the interfacing achieved through a device controller;
    managing and communicating with a plurality of RFID device drivers, the managing and communicating with achieved using individual device managers; and
    communicating with and operating one or more RFID devices of the plurality of RFID devices, the communicating with and operating achieved through a RFID device driver of the plurality of RFID device drivers.

15. The radio frequency identification management system as claimed in claim 5, wherein devices of the same type share a plurality of common characteristics.

16. The radio frequency identification management system as claimed in claim 1, wherein managing the one or more RFID devices comprises one or more of:
    setting a power level of RFID readers;
    setting a tag type of RFID readers;
    retrieving statistic and diagnostic information of RFID readers; and
    retrieving a connection state of RFID readers.

17. The radio frequency identification management system as claimed in claim 1, wherein communicating with the one or more RFID devices comprises sending function commands to RFID devices through RFID device drivers, the function commands including:
    function commands to read user data from an RFID tag;
    function commands to write user data to the RFID tag; and
    function commands to kill the RFID tag.

18. The radio frequency identification management system as claimed in claim 1, wherein a device manager of the plurality of device managers further comprises an additional RFID device driver for communicating with one or more RFID devices.

* * * * *

UNITED STATES PATENT AND TRADEMARK OFFICE
CERTIFICATE OF CORRECTION

PATENT NO. : 7,522,050 B2
APPLICATION NO. : 11/394384
DATED : April 21, 2009
INVENTOR(S) : Le Page 1 of 1

It is certified that error appears in the above-identified patent and that said Letters Patent is hereby corrected as shown below:

In Column 1, Lines 6-10, delete "Radio frequency identification (RFID)..........written to by a reader." and insert -- The present invention relates generally to radio frequency identification, and in particular, to a system and method of radio frequency identification device management. --, therefor.

In Column 1, Lines 16-19, delete "A basic system.......by a reader." and insert the same at Line 15, after "assets.", as a continuation paragraph.

In Column 2, Line 30, delete "and".

In Column 2, Line 34, delete "system." and insert -- system; and --, therefor.

In Column 3, Lines 54-56, delete "Next, one or more.......method (120)." and insert the same at Line 53, after "devices (122).", as a continuation paragraph.

In Column 4, Line 26, delete "host-to-device device" and insert -- host-to-device --, therefor.

In Column 8, Line 1, in Claim 10, delete "method" and insert -- method as --, therefor.

In Column 8, Line 6, in Claim 11, delete "method" and insert -- method as --, therefor.

In Column 8, Line 15, in Claim 12, delete "method" and insert -- method as --, therefor.

Signed and Sealed this
Nineteenth Day of March, 2013

Teresa Stanek Rea
*Acting Director of the United States Patent and Trademark Office*